(12) United States Patent

Bush, III et al.

(10) Patent No.: US 12,593,938 B2

(45) Date of Patent: Apr. 7, 2026

(54) PORTABLE COOKING STATION WITH INDEPENDENTLY ADJUSTABLE LEG HEIGHT, SYSTEM AND METHOD THEREOF

(71) Applicant: North Atlantic Imports, LLC, Logan, UT (US)

(72) Inventors: James C. Bush, III, Providence, UT (US); James P. Miner, Preston, ID (US)

(73) Assignee: North Atlantic Imports, LLC, Logan, UT (US)

( * ) Notice: Subject to any disclaimer, the term of this patent is extended or adjusted under 35 U.S.C. 154(b) by 362 days.

(21) Appl. No.: 18/213,083

(22) Filed: Jun. 22, 2023

(65) Prior Publication Data

US 2023/0414038 A1 Dec. 28, 2023

Related U.S. Application Data

(60) Provisional application No. 63/355,022, filed on Jun. 23, 2022.

(51) Int. Cl.
*A47J 37/06* (2006.01)
*A47J 37/07* (2006.01)

(52) U.S. Cl.
CPC .... *A47J 37/0664* (2013.01); *A47J 2037/0795* (2013.01)

(58) Field of Classification Search
CPC ...................... A47J 37/0664; A47J 2037/0795
USPC ...................................................... 126/25 R
See application file for complete search history.

(56) References Cited

U.S. PATENT DOCUMENTS

| | | | |
|---|---|---|---|
| 3,651,796 A * | 3/1972 | Nelson ................ | A47J 37/0704 248/500 |
| 3,750,989 A | 8/1973 | Bergeson | |
| 4,215,667 A * | 8/1980 | Hsu ........................ | F24B 1/202 126/25 AA |
| 4,949,923 A | 8/1990 | Daily | |
| 6,205,995 B1 * | 3/2001 | Odenwald ................ | F24C 3/14 99/425 |
| 6,923,419 B2 | 8/2005 | George et al. | |
| 8,220,770 B2 | 7/2012 | Justis | |
| 8,511,636 B2 | 8/2013 | Kucuk et al. | |
| 8,632,038 B2 | 1/2014 | Christian et al. | |
| 10,327,588 B2 | 6/2019 | Dahle et al. | |
| 10,663,175 B2 | 5/2020 | Jang et al. | |
| 10,814,897 B2 | 10/2020 | Choueifati et al. | |
| 2004/0060148 A1 | 4/2004 | Ebeling et al. | |
| 2005/0039612 A1 * | 2/2005 | Denny ................ | A47J 37/0664 99/450 |

(Continued)

*Primary Examiner* — Avinash A Savani

(74) *Attorney, Agent, or Firm* — David L. Stott

(57) ABSTRACT

A portable cooking system with adjustable leg height includes a cooking station and multiple station legs. The station legs are removably coupled to an underside of the cooking station. Each of the legs include a threaded shaft, a washer and a leg base, the washer being fixed to the threaded shaft to define an upper winding portion of the threaded shaft along one side of the washer and a lower winding portion of the threaded shaft along the other side of the washer. The upper winding portion is configured to couple directly to the underside of the cooking station and the leg base is configured to be rotatably moveable along the lower winding portion to adjust a height of each station leg of the cooking station.

15 Claims, 3 Drawing Sheets

(56) References Cited

U.S. PATENT DOCUMENTS

| 2012/0187270 | A1  | 7/2012  | Haarlander et al. |
|---|---|---|---|
| 2013/0292371 | A1* | 11/2013 | Braden .................. F24C 15/34 |
|  |  |  | 126/41 R |
| 2018/0347822 | A1  | 12/2018 | Jang et al. |
| 2020/0008618 | A1* | 1/2020  | Seong .................... F24B 7/005 |
| 2021/0244233 | A1  | 8/2021  | Bush, III et al. |

* cited by examiner

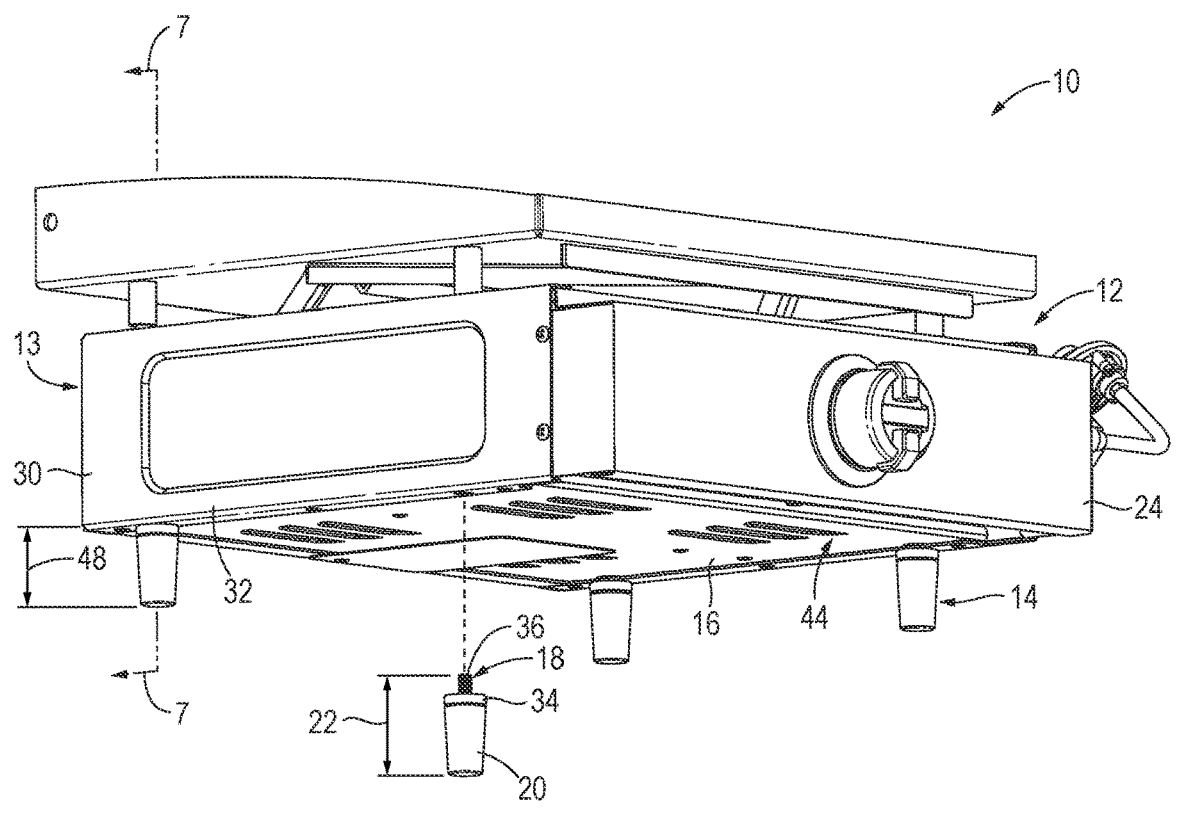
FIG. 1
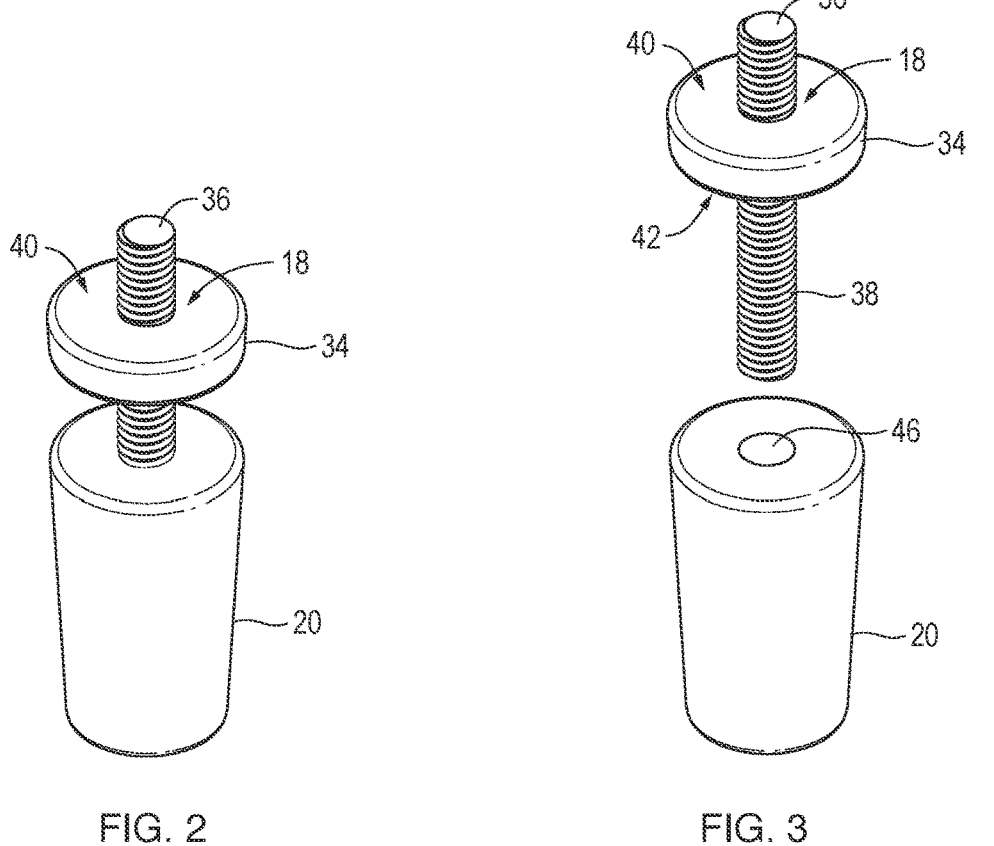
FIG. 2                    FIG. 3

PORTABLE COOKING STATION WITH INDEPENDENTLY ADJUSTABLE LEG HEIGHT, SYSTEM AND METHOD THEREOF

CROSS-REFERENCE TO RELATED APPLICATIONS

This application claims the benefit of U.S. Provisional Application No. 63/355,022, filed Jun. 23, 2022, the disclosure of which is hereby incorporated by reference herein in its entirety.

TECHNICAL FIELD

The present invention relates generally to portable cooking systems and, more specifically, the present inventions relates to a portable cooking system with legs having adjustable height.

BACKGROUND

The ability to cook outdoors on various surfaces, such as the ground, countertop, or tailgate, has become popular and desirable. However, most cooking stations are not readily adaptable for cooking on most any surface. This is even more problematic when cooking with a griddle type cooking station due to griddles having a flat cooking surface. Further, most cooking stations are difficult to readily transport for cooking at various locations.

BRIEF SUMMARY OF THE INVENTION

The present invention is directed to various embodiments of a portable cooking station, system and method thereof. In one embodiment, the portable cooking station includes a main body and multiple station legs. The main body extends to define a front side, a rear side, a left side and a right side each extending between an underside and an upper side, the upper side of the main body configured to support a cooking surface such that the cooking surface is positioned above heating elements supported by the main body. The underside of the main body includes multiple shaft coupling structures sized and configured to couple to the multiple station legs. Each one of the station legs includes a threaded shaft, a washer, and a leg base. The threaded shaft longitudinally extends to define a shaft axis. The washer is fixedly coupled to the threaded shaft such that the threaded shaft extends to define an upper winding portion above the washer and a lower winding portion below the washer. The upper winding portion is configured to be threadably coupled to one of the shaft coupling structures so that the washer rotatably tightens against structure adjacent the one of the shaft coupling structures to fixate the threaded shaft to the underside of the main body. The leg base extends between a first end and a second end, the first end defining a shaft insert therein. The second end of the leg base is configured to at least partially support the main body. The shaft insert of the leg base is sized and configured to threadably receive the lower winding portion such that the leg base is linearly movable along the lower winding portion to adjust a distance between the second end of the leg base and the washer.

In another embodiment, the distance defined between the second end of the leg base and the washer of each of the station legs is independently adjustable. In another embodiment, the distance is adjustable over a range substantially equal to a length of the lower winding portion of the threaded shaft. In still another embodiment, the leg base rotates about the shaft axis to adjust the distance such that rotation of the leg base linearly moves the leg base over the lower winding portion of the threaded shaft. In yet another embodiment, the shaft insert extends a depth within the leg base that is greater than, or substantially equal to, a length of the lower winding portion of the threaded shaft.

In another embodiment, the underside of the main body includes a bottom panel. In another embodiment, the cooking surface includes a griddle. In still another embodiment, the multiple station legs include four station legs, each station leg positioned adjacent one of the left side and the right side of the main body. In another embodiment, the upper side of the main body includes apertures defined therein, the apertures sized and configured to receive corresponding ones of griddle legs for supporting a griddle.

In accordance with another embodiment of the present invention, a portable cooking system including a cooking station with a main body extending to define a front side, a rear side, a left side and a right side each extending between an underside and an upper side, the upper side of the main body configured to support a cooking surface such that the cooking surface is positioned above heating elements supported by the main body, the underside of the main body including multiple shaft coupling structures is provided. The portable cooking system includes multiple station legs each sized and configured to couple to a corresponding one of the multiple shaft coupling structures positioned along the underside of the main body. Each one of the station legs include a threaded shaft, a washer, and a leg base. The threaded shaft longitudinally extends to define a shaft axis. The washer is fixedly coupled to the threaded shaft such that the threaded shaft extends to define an upper winding portion above the washer and a lower winding portion below the washer. The upper winding portion is configured to be threadably coupled to one of the shaft coupling structures so that the washer rotatably tightens against structure adjacent the one of the shaft coupling structures to fixate the threaded shaft to the underside of the main body. The leg base extends between a first end and a second end, the first end defining a shaft insert therein. The second end of the leg base is configured to at least partially support the main body, the shaft insert of the leg base sized and configured to threadably receive the lower winding portion such that the leg base is linearly movable along the lower winding portion to adjust a distance between the second end of the leg base and the washer.

In another embodiment, the distance defined between the second end of the leg base and the washer of each of the station legs is independently adjustable. In another embodiment, the distance is adjustable over a range substantially equal to a length of the lower winding portion of the threaded shaft. In still another embodiment, the leg base rotates about the shaft axis to adjust the distance such that rotation of the leg base linearly moves the leg base over the lower winding portion of the threaded shaft. In another embodiment, the shaft insert extends a depth within the leg base that is greater than, or substantially equal to, a length of the lower winding portion of the threaded shaft. In yet another embodiment, the multiple station legs include four station legs, each station leg configured to be positioned adjacent one of the left side and the right side of the main body.

In accordance with another embodiment of the present invention, a method of adjusting leg height of a portable cooking system is provided. The method includes the steps of: providing a cooking station with a main body extending to define a front side, a rear side, a left side and a right side each extending between an underside and an upper side, the upper side of the main body configured to support a cooking surface such that the cooking surface is positioned above heating elements supported by the main body, the underside of the main body including multiple shaft coupling structures sized and configured to couple to multiple station legs; inserting an upper winding portion of a threaded shaft of one of the station legs into one of the shaft coupling structures along the underside of the main body such that a washer fixed to the threaded shaft rotatably tightens against structure adjacent the one of the shaft coupling structures; and adjusting a distance between a bottom end of a leg base of the one of the station legs and the fixed washer by rotating the leg base about an axis defined by the threaded shaft so that the leg base is rotatably moveable along a length of a lower winding portion of the threaded shaft of the one of the station legs.

In another embodiment, the adjusting step includes the step of independently adjusting the distance defined between the second end of the leg base and the washer of each one of the station legs. In another embodiment, the inserting step includes the step of rotatably coupling the upper winding portion of the threaded shaft of the one of the station legs into the one of the shaft coupling structures.

In accordance with another embodiment of the present invention, a portable cooking system with adjustable height is provided. The portable cooking system including a cooking station and multiple station legs. The cooking station extends to define a front panel, a rear panel, a left panel, and a right panel. The front panel, the rear panel, the left panel, and the right panel extends to define a bottom panel and an inner portion. The inner portion contains heating elements sized and configured to heat a cooking surface of the cooking station. The multiple station legs are removably coupled to the bottom panel of the cooking station, the multiple station legs each including a leg base and a threaded shaft, the threaded shaft being sized and configured to adjust the height of the multiple station legs.

In another embodiment, the threaded shaft includes a washer such that the washer is fixed to a position on the threaded shaft where the washer may define an upper winding portion and a lower winding portion along a length of the threaded shaft. In another embodiment, the bottom panel extends to define a shaft coupling for each of the multiple station legs, the shaft coupling being sized and configured to receive the upper winding portion of the threaded shaft. In another embodiment, the upper winding portion of the threaded shaft may be sized and configured to be inserted within the shaft coupling of the bottom panel such that the washer is flush with the bottom panel of the cooking station.

In another embodiment, the lower winding portion of the threaded shaft may be sized and configured to insert within the leg base such that the washer is flush with the leg base. The leg base may be adjustable along the lower winding portion such that a height of the multiple station legs is adjustable. In another embodiment, the height of the multiple station legs are each individually adjustable by the leg base such that the multiple station legs may be positioned at different heights, upon the cooking station being positioned on an uneven surface.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 1 is a perspective view of the portable cooking system, depicting one of multiple station legs separated from the portable cooking system, according to an embodiment of the present invention;

FIG. 2 is a perspective view of one of the multiple station legs, according to another embodiment of the present invention;

FIG. 3 is an exploded view of one of the multiple station legs, according to another embodiment of the present invention;

DETAILED DESCRIPTION OF THE INVENTION

Figures 4, 5:
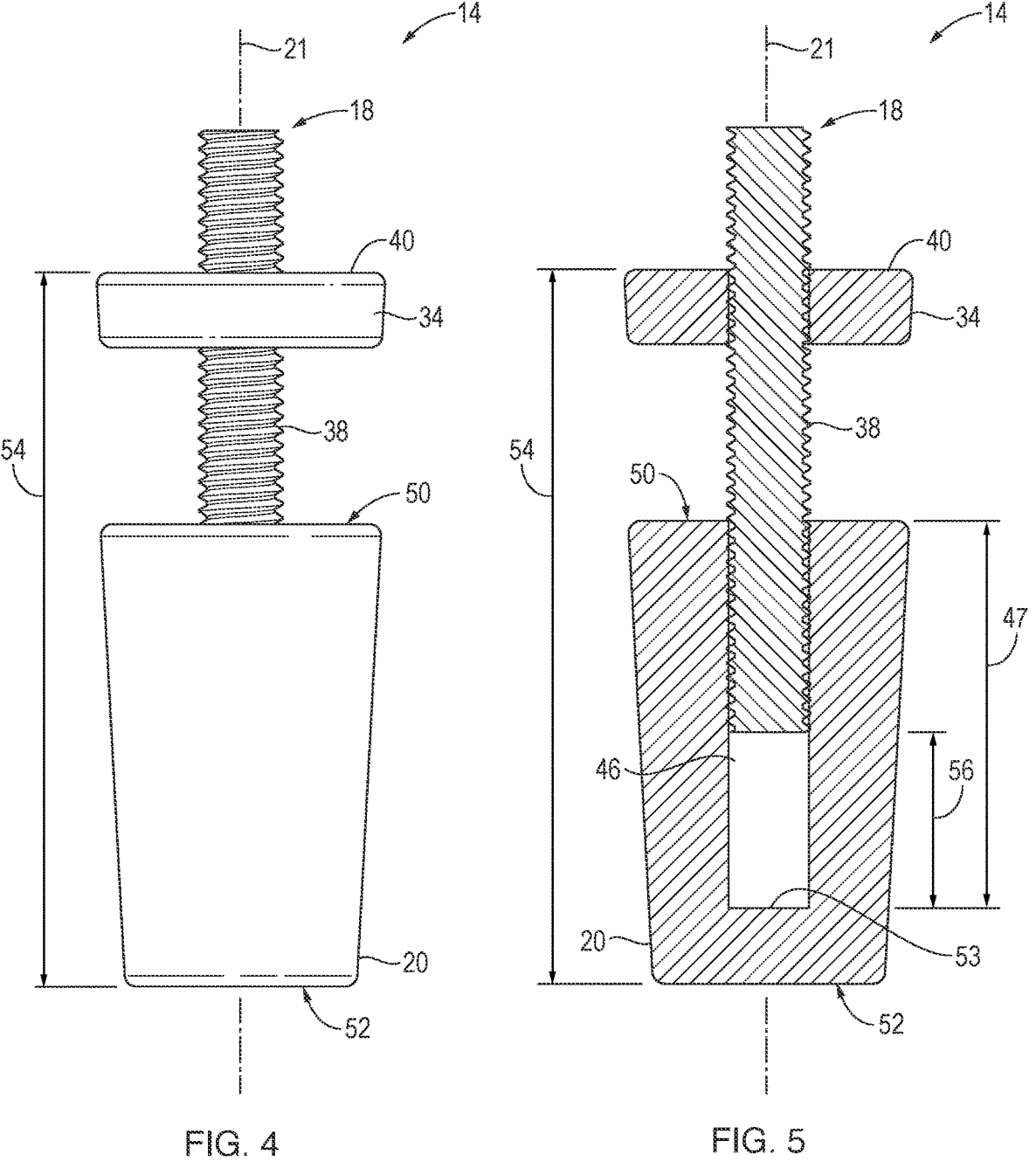
FIG. 4 is a front view of one of the multiple station legs, depicting a leg base of the one station leg partially adjusted along a length of a threaded shaft of the station leg, according to another embodiment of the present invention.
FIG. 5 is a cross sectional view of the one of multiple station legs of FIG. 4, depicting a shaft insert defined in the leg base, according to another embodiment of the present invention.

Referring to FIG. 1, a portable cooking system 10 that may be adjustable in its height is provided. In one embodiment, the portable cooking system 10 may include a cooking station 12 with multiple station legs 14, the cooking station 12 being a table-top type cooking station which may be readily adapted to be placed on an uneven surface, such as the ground surface. Each of the multiple station legs 14 may be removably coupled to a bottom panel 16 of the cooking station 12. Further, the multiple station legs 14 may include a threaded shaft 18 and leg base 20 such that the threaded shaft 18 may be rotatably coupled to the bottom panel 16 and the leg base 20 may be adjustable along the threaded shaft 18. The leg base 20 may rotatably move along the threaded shaft 18 such that a height 22 of the multiple station legs 14 may be adjustable. The height 22 of each one of the multiple station legs 14 may be independently adjustable such that the cooking station 12 may be positioned on an uneven ground surface or the station legs 14 of the cooking station 12 may be adjusted to a height desired by the user. The concept of adjusting the height of legs 14 of the portable cooking system 10 may be best suited to be employed for outdoor portable cooking stations, but this concept may also be contemplated for use with indoor portable cooking stations as well. For example, upon cooking on a griddle type cooking station, it sometimes may be a preference to be able to adjust the height of the legs so that the flat cooking surface of the griddle leans or is slightly inclined to provide a slope in a particular direction so that food byproduct may readily drain in that direction, as desired by the user.

Now with reference to FIGS. 1-3, the cooking system 10 and the cooking station 12 may extend to define a main body 13 or frame structure. Such main body 13 or frame structure may include multiple panels and various structural components. For example, the main body 13 of the cooking station 12 may extend to define a front panel 24, rear panel 26, right panel 28, and left panel 30. The front panel 24, rear panel 26, right panel 28, and left panel 30 may extend to define a lower periphery 32 such that a bottom panel 16 may be coupled to the lower periphery 32 (see, also FIG. 6). The bottom panel 16 may extend to include the multiple station legs 14. The multiple station legs 14 may be sized and configured to be removably coupled to the bottom panel 16. In another embodiment, the multiple station legs 14 may be coupled to the bottom panel 16 such that the multiple station legs 14 may not be removed from the bottom panel 16 or from structure adjacent the bottom panel 16. The multiple station legs 14 may include the leg base 20 and threaded shaft 18. The threaded shaft may 18 include a washer 34 such that the washer 34 may be fixed to a particular position along a length of the threaded shaft 18 to define a upper winding portion 36 and lower winding portion 38. The upper winding portion 36 may be the portion of the threaded shaft above the fixed position of the washer 34. The lower winding portion 36 may be the portion of the threaded shaft below the fixed position of the washer 34. The washer 34 may extend to define an upper surface 40 and a lower surface 42 such that the upper surface 40 may face toward the upper winding portion 36 and the lower surface 42 may face toward the lower winding portion 38. The upper winding portion 36 of the threaded shaft 18 may be sized and configured to extend and be removably coupled to the bottom panel 16. The upper winding portion 36, being secured to the bottom panel 16, may extend such that the upper surface 40 of the washer 34 may be flush and rotatably tightened against an underside 44 of the bottom panel 16. The leg base 20 may include a shaft insert 46 defined therein such that the shaft insert 46 may be a hollow portion where the lower winding portion 38 may be sized and configured to extend within a portion of a length 47 (FIG. 5) of the shaft insert 46. The lower winding portion 38, being secured to the leg base 20, may extend such that the lower surface 42 of the washer 34 may be flush to the leg base 20. The upper surface 40 of the washer 34 being flush to the underside 44 of the bottom panel 16 and the lower surface 42 of the washer 34 being flush to the leg base 20 may define a minimum height position 48 of any one of the multiple station legs 14.

Now with reference to FIGS. 4 and 5, as previously set forth, each one of the station legs 14 may include the leg base 20 threadably coupled to the threaded shaft 18, the threaded shaft 18 having washer 34 fixed thereto. Further, each one of the station legs 14 may define an axis 21 extending axially and aligned centrally along the threaded shaft 18 such that the leg base rotates about the axis to move along the length of the lower winding portion 38. Further, the leg base 20 may extend between a first end 50 and a second end 52 thereof. The shaft insert 46 of the leg base may extend from the first end 50 to an insert bottom 53. The surface defining the shaft insert 46 may extend with windings or threads so that the lower winding portion 38 of the threaded shaft 18 may be threaded into the shaft insert 46 of the leg base 20. In this manner, the leg base 20 may be rotatably secured at any position along a length of the lower winding portion 38. Further, in another embodiment, the lower winding portion 38 may be threaded into the shaft insert 46 and positioned along the length 47 of the shaft insert 46 such that the multiple station legs 14 may each be independently adjusted to an adjusted height position 54. In one embodiment, upon the leg base 20 being rotatably moved away from the washer 34 along the lower winding portion 38, the adjusted height position 54 may be defined between the upper surface 40 of the washer 34 and the second end 52 or bottom end of the leg base 20. In another embodiment, the adjusted height position 54 may be defined by the lower winding portion 38 being positioned along any portion of the length 47 of the shaft insert 46. The multiple station legs 14, in the adjusted height position 54, may define a space 56 within the length 47 of the shaft insert 46 of the leg base 20. The space 56 may enlarge as the lower winding portion 38 is unthreaded from the shaft insert 46 of the leg base 20, and the space 56 may be minimized as the lower winding portion 38 is threaded into the shaft insert 46 of the leg base 20. As such, the adjusted height position 54 may increase as the space 56 enlarges, and the adjusted height position 54 may decrease as the space 56 is minimized. In another embodiment, the range by which the height that the station legs 14 may be adjusted may be substantially equal to a longitudinal length of the lower winding portion 38 of the threaded shaft 18. Such range may also be the difference between a maximum height position and the minimum height position 48, the maximum height position being the position that the tip end of the lower winding portion 38 may held adjacent to the first end 50 of the leg base 20.

Figures 6, 7, 8, 8A:
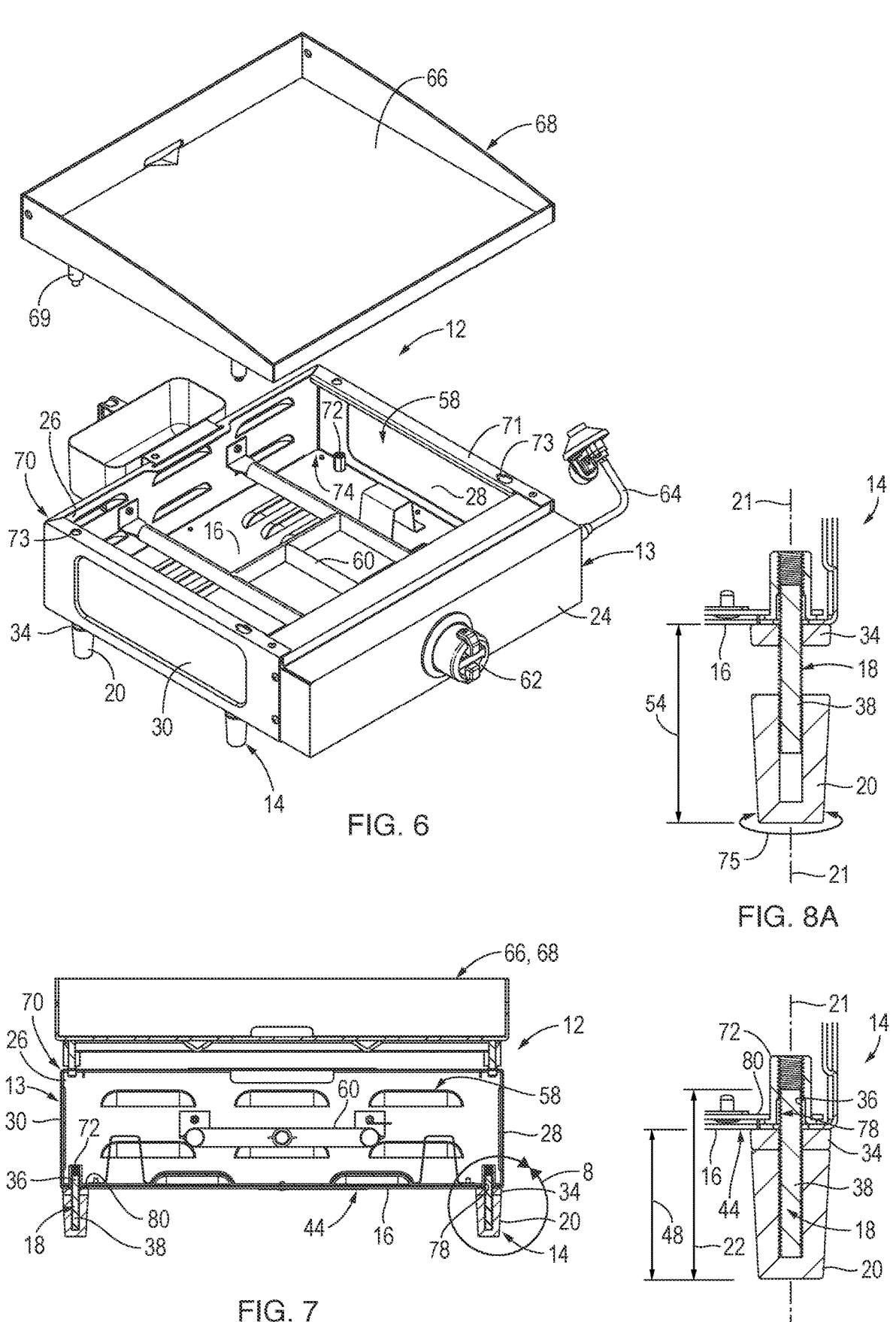
FIG. 6 is a partially exploded view of the portable cooking system, depicting a cooking station configured to support a griddle, according to another embodiment of the present invention.
FIG. 7 is a cross sectional view of the cooking station taken along section line 7-7 of FIG. 1, according to another embodiment of the present invention.
FIG. 8 is an enlarged view of one of the multiple station legs taken from region 8 in FIG. 7, depicting one of the multiple station legs positioned in a bottom panel of the cooking station and depicting the leg base positioned adjacent the washer to a minimized position, according to another embodiment of the present invention.
FIG. 8A is an enlarged view of one of the multiple station legs, depicting the leg base of one of the multiple station legs adjusted along a length of the threaded shaft, according to another embodiment of the present invention.

Now with reference to FIG. 6-8, as previously set forth, the cooking station 12 may include the front panel 24, the rear panel 26, the right panel 28, and the left panel 30 extending to define the inner portion 58. The inner portion 58 may house gas burners 60 sized and configured to extend from the front panel 24 to the rear panel 26. The front panel 24 may include one or more burner knobs 62 that may correspond with the gas burners. Further, the front panel may include an ignition source that may be in the form of a button or switch or integrated into any one of the burner knobs 62 upon turning the burner knob 62. Such opening or turning of the one or more burner knobs 62 may open or close valves associated with the gas burners 60 for supplying gas thereto, such as propane gas or natural gas, from a gas line 64, as known to one of ordinary skill in the art. In this manner, gas may be supplied to the gas burners and ignited to heat a cooking surface 66, such as a grill or griddle 68. Further, such griddle 68 may include griddle legs 69 that may be supported along an upper periphery 71 or edge of the main body 13 or frame work, such as along an upper edge of the right and left panels 28, 30 of the main body of the cooking station 12. In this manner, the griddle 68 may be removably supported by the man body 13 such that the griddle legs 69 may be held within apertures 73 defined along or adjacent the upper periphery 71 or edge of the main body 13 of the cooking station 12. Further, the cooking station 14 may include the necessary structural and functional components, such as valves, tubing, igniters, and any other components for the gas burners 60 and cooking station to properly function and operate as known to one of ordinary skill in the art. The bottom panel 16 of the main body of the cooking station 12 may extend below the gas burners 60. The bottom panel 16 may extend to define multiple shaft couplings 72, or shaft coupling structures, such that there is one shaft coupling 72 defined for each of the multiple station legs 14.

The shaft coupling 72 may be positioned adjacent a corner 74 of the bottom panel 16 such that the shaft coupling 72 may be positioned in a region which may offer the most stability to the cooking station 12. Further, the shaft coupling 72 may longitudinally extend substantially perpendicular relative to the bottom panel 16 and into the inner portion 58 of the cooking station 12 so as to define a coupling axis that may be co-axial with the axis 21 of the station legs 14. Even further, the shaft coupling 72 may extend to define a female coupling structure sized and configured to receive the upper winding portion 36 of the threaded shaft 18 from the underside 44 of the bottom panel 16, the female coupling structure extending to receive the threaded shaft 18 or male coupling structure along the axis 21. In another embodiment, the shaft coupling 72 may be fastened into the bottom panel 16 or sandwiched between the bottom panel 16 and a structural panel 80. The shaft coupling 72 may define an interior surface 78 therein that may be include threads or windings sized and configured to couple to and mate with the upper winding portion 36 of the threaded shaft 18. As previously set forth, upon rotatably inserting the upper winding portion 36 of the threaded shaft 18 within the shaft coupling 72, the upper surface 40 (FIG. 3) of the washer 34 may be rotatably tightened (manually) against the underside 44 of the bottom panel 16 so as to be flush to the underside 44 of the bottom panel 16. In one embodiment, the upper winding portion 36 may be configured to rotatably thread within the interior 78 of the shaft coupling 72 such that the multiple station legs 14 are removably coupled to the cooking station 12. In another embodiment, the upper winding portion 36 may be fixed to the interior 78 of the shaft coupling 72 such that the multiple station legs 14 are fixed to the cooking station 12. The upper winding portion 36, being threaded within the interior 78 of the shaft coupling 72, may be sized and configured to secure the multiple station legs 14 via rotatably tightening of the washer 34 against the bottom panel 16, as shown in FIG. 8. Once a given station leg 14 is tightened against the bottom panel 16 with the washer 34, the leg base 20 may be rotatably moved along the lower winding portion 38 to independently adjust a height of the given station leg 14, as depicted in FIG. 8A. Further, as depicted in FIG. 8A, the leg base 20 may rotate about the axis 21, as shown by rotational arrow 75, to increase or decrease the adjusted height position 54 of each one of the station legs 14. For example, from a bottom end view, the leg base 20 may be rotated clock-wise to move the leg base 20 linearly toward the washer 34 or the leg base may be rotated counter clock-wise to move the leg base 20 linearly away from the washer 34. In this manner, each one of the multiple station legs 14 may be independently adjusted in their respective height so as to rotatably move the leg base 20 along the threaded shaft 18 between a minimum height position 48 (FIG. 8) to an adjusted height position 54 (FIG. 8A). The adjusted height position 54 may include multiple different heights dependent upon the position of the leg base 20 along an elongated length of the lower winding portion 38 of the threaded shaft 18. With this arrangement, a user may independently adjust a height of each one of the station legs 14 to assist the user in adjusting the stability of the cooking station 12 that may be positioned on an uneven surface or to assist the user in manipulating the inclination of the cooking station 12 to provide a slope to the cooking surface 66 of the griddle 68 or to readily be able to manipulate the cooking station 12 to sit level, and thus, the cooking surface 66 of the griddle 68 being positioned level, as desired by the user.

The various structural components of the embodiments of the cooking station 12 and the station legs 14 set forth herein may be formed from metallic materials, such as stainless steel, steel or aluminum, or any other suitable metallic material, or some components may be formed from one or more polymeric materials, such as the leg base 20 or washer 34 of the station legs 14, as known by one of ordinary skill in the art. Further, the components of the cooking station 12 and the station legs 14 may be formed by employing known manufacturing techniques and processes, such as welding, molding, milling, drilling, bending, fastening, etc., as known to one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A portable cooking station, comprising:
a main body extending to define a front side, a rear side, a left side and a right side each extending between an underside and an upper side, the upper side of the main body configured to support a cooking surface such that the cooking surface is positioned above heating elements supported by the main body, the underside of the main body including multiple shaft coupling structures sized and configured to couple to multiple station legs, each one of the station legs including:
a threaded shaft longitudinally extending to define a shaft axis;
a washer fixedly coupled to the threaded shaft such that the threaded shaft extends to define an upper winding portion above the washer and a lower winding portion below the washer, the upper winding portion configured to be threadably coupled to one of the shaft coupling structures so that the washer rotatably tightens against structure adjacent the one of the shaft coupling structures to fixate the threaded shaft to the underside of the main body; and
a leg base extending between a first end and a second end, the first end defining a shaft insert therein, the second end of the leg base configured to at least partially support the main body, the shaft insert of the leg base sized and configured to threadably receive the lower winding portion such that the leg base is linearly movable along the lower winding portion to adjust a distance between the second end of the leg base and the washer;
wherein the distance defined between the second end of the leg base and the washer of each of the station legs is independently adjustable.

2. The portable cooking station of claim 1, wherein the distance is adjustable over a range substantially equal to a length of the lower winding portion of the threaded shaft.

3. The portable cooking station of claim 1, wherein the leg base rotates about the shaft axis to adjust the distance such that rotation of the leg base linearly moves the leg base over the lower winding portion of the threaded shaft.

4. The portable cooking station of claim 1, wherein the shaft insert extends a depth within the leg base that is greater than, or substantially equal to, a length of the lower winding portion of the threaded shaft.

5. The portable cooking station of claim 1, wherein the underside of the main body comprises a bottom panel.

6. The portable cooking station of claim 1, wherein the cooking surface comprises a griddle.

7. The portable cooking station of claim 1, wherein the multiple station legs comprise four station legs, each station leg positioned adjacent one of the left side and the right side of the main body.

8. The portable cooking station of claim 1, wherein the upper side of the main body comprises apertures defined therein, the apertures sized and configured to receive corresponding ones of griddle legs for supporting a griddle.

9. A portable cooking system including a cooking station with a main body extending to define a front side, a rear side, a left side and a right side each extending between an underside and an upper side, the upper side of the main body configured to support a cooking surface such that the cooking surface is positioned above heating elements supported by the main body, the underside of the main body including multiple shaft coupling structures, the portable cooking system comprising:

multiple station legs each sized and configured to couple to a corresponding one of the multiple shaft coupling structures positioned along the underside of the main body, each one of the station legs including:

a threaded shaft longitudinally extending to define a shaft axis;

a washer fixedly coupled to the threaded shaft such that the threaded shaft extends to define an upper winding portion above the washer and a lower winding portion below the washer, the upper winding portion configured to be threadably coupled to one of the shaft coupling structures so that the washer rotatably tightens against structure adjacent the one of the shaft coupling structures to fixate the threaded shaft to the underside of the main body; and a leg base extending between a first end and a second end, the first end defining a shaft insert therein, the second end of the leg base configured to at least partially support the main body, the shaft insert of the leg base sized and configured to threadably receive the lower winding portion such that the leg base is linearly movable along the lower winding portion to adjust a distance between the second end of the leg base and the washer;

wherein the distance defined between the second end of the leg base and the washer of each of the station legs is independently adjustable.

10. The portable cooking system of claim 9, wherein the distance is adjustable over a range substantially equal to a length of the lower winding portion of the threaded shaft.

11. The portable cooking system of claim 9, wherein the leg base rotates about the shaft axis to adjust the distance such that rotation of the leg base linearly moves the leg base over the lower winding portion of the threaded shaft.

12. The portable cooking system of claim 9, wherein the shaft insert extends a depth within the leg base that is greater than, or substantially equal to, a length of the lower winding portion of the threaded shaft.

13. The portable cooking system of claim 9, wherein the multiple station legs comprise four station legs, each station leg configured to be positioned adjacent one of the left side and the right side of the main body.

14. The portable cooking station of claim 1, wherein the leg base of each one of the station legs is configured to rotate about the shaft axis to adjust the distance such that the leg base is configured to rotate relative to the main body.

15. The portable cooking system of claim 9, wherein the leg base of each one of the station legs is configured to rotate about the shaft axis to adjust the distance such that the leg base is configured to rotate relative to the main body.

* * * * *